United States Patent
Koers (10) Patent No.: US 9,606,232 B2
(45) Date of Patent: Mar. 28, 2017

(54) METHOD FOR DETERMINING AND/OR COMPENSATING RANGE OFFSET OF A RANGE SENSOR

(71) Applicant: MELEXIS TECHNOLOGIES N.V., Tessenderlo (BE)

(72) Inventor: Gaetan Koers, Humbeek (BE)

(73) Assignee: MELEXIS TECHNOLOGIES N.V., Tessenderlo (BE)

( * ) Notice: Subject to any disclaimer, the term of this patent is extended or adjusted under 35 U.S.C. 154(b) by 446 days.

(21) Appl. No.: 14/048,306

(22) Filed: Oct. 8, 2013

(65) Prior Publication Data

US 2014/0098358 A1   Apr. 10, 2014

(30) Foreign Application Priority Data

Oct. 8, 2012  (GB) .................................. 1217992.5

(51) Int. Cl.
| | |
|---|---|
| G01C 3/08 | (2006.01) |
| G01S 17/10 | (2006.01) |
| G01S 17/89 | (2006.01) |
| G01S 7/497 | (2006.01) |
| G01S 17/36 | (2006.01) |

(52) U.S. Cl.
CPC .............. *G01S 17/10* (2013.01); *G01S 7/497* (2013.01); *G01S 17/89* (2013.01); *G01S 17/36* (2013.01)

(58) Field of Classification Search
CPC ........... G01S 17/10; G01S 7/497; G01S 17/89
See application file for complete search history.

(56) References Cited

U.S. PATENT DOCUMENTS

| | | | |
|---|---|---|---|
| 5,531,472 A | * | 7/1996 | Semchena ......... B60R 21/01538 280/735 |
| 6,825,455 B1 | | 11/2004 | Schwarte |
| 7,053,357 B2 | | 5/2006 | Schwarte |
| 7,471,376 B2 | | 12/2008 | Bamji et al. |

(Continued)

FOREIGN PATENT DOCUMENTS

| | | |
|---|---|---|
| EP | 1659418 A1 | 5/2006 |
| EP | 2275833 A1 | 1/2011 |

(Continued)

OTHER PUBLICATIONS

Supplemental EP Search Report from EP Application No. 13187652.6, Jan. 20, 2014.

*Primary Examiner* — Luke Ratcliffe
*Assistant Examiner* — Samantha K Abraham
(74) *Attorney, Agent, or Firm* — Workman Nydegger (57) ABSTRACT

A method for compensating range offset of a range sensor located in a predetermined position in a spatial environment and comprising a pixel array adapted for measuring a distance, the spatial environment comprising at least two stationary reference positions located at predetermined reference distances, the method comprising the steps of: a) determining distance values to the reference positions; b) calculating differences between the distance values and the corresponding reference distances; c) determining a range offset value as the maximum of the differences; d) measuring distance values to positions within the spatial environment using the pixel array; e) correcting the measured distance values by subtracting the determined in-situ range offset value from each of the measured distance values.

18 Claims, 3 Drawing Sheets

(56) References Cited

U.S. PATENT DOCUMENTS

| | | |
|---|---|---|
| 7,502,711 B2 | 3/2009 | Lamesch |
| 7,719,662 B2 | 5/2010 | Bamji et al. |
| 7,936,449 B1 | 5/2011 | Bamji et al. |
| 2005/0092897 A1 | 5/2005 | Schwarte |
| 2006/0021238 A1* | 2/2006 | Sato et al. .................. 33/356 |
| 2007/0042706 A1* | 2/2007 | Ledeczi .................. G01S 5/14 |
| | | 455/3.01 |
| 2007/0299627 A1 | 12/2007 | Lamesch |
| 2008/0007709 A1 | 1/2008 | Bamji et al. |
| 2008/0180650 A1 | 7/2008 | Lamesch |
| 2009/0115995 A1 | 5/2009 | Bamji et al. |
| 2010/0094469 A1* | 4/2010 | Gunnarsson ............ F02B 39/00 |
| | | 700/282 |
| 2012/0206575 A1* | 8/2012 | Massanell et al. ............. 348/46 |
| 2013/0265563 A1* | 10/2013 | Vogt et al. .................. 356/4.01 |

FOREIGN PATENT DOCUMENTS

| | | |
|---|---|---|
| WO | 98/10255 A1 | 3/1998 |
| WO | 2008005516 A2 | 1/2008 |

* cited by examiner

METHOD FOR DETERMINING AND/OR COMPENSATING RANGE OFFSET OF A RANGE SENSOR

FIELD OF THE INVENTION

The present invention relates to the field of range sensors, such as e.g. time-of-flight (ToF) image sensors. More specifically the present invention relates to a method for detecting and/or compensating on the fly range offset of a range sensor in application conditions, e.g. due to temperature, ageing, etc.

BACKGROUND OF THE INVENTION

Depth or range cameras are devices that produce a 2D image showing the distance between the sensor device and positions (e.g. points) in a scene. The resulting image, the range image, has pixel values which correspond to the distances to these positions. If the sensor is properly calibrated, the pixel values can be given directly in physical distance units such as meters.

A time-of-flight camera (ToF camera) is a range imaging camera that determines the distance based on the time needed for a light signal to travel from the camera to an object in the scene, and back, taking into account the speed of light (c=approximately 300,000 km per second). The camera has an illumination unit, typically implemented with one or more lasers or LEDs, which is switched on for a very short time, the resulting light pulse illuminates the scene and is reflected by objects present therein. The camera gathers the reflected light onto a sensor plane. Depending on the distance, the incoming light experiences a delay with respect to the emitted light pulse. An object 1.0 m away will delay the light by 6.66 ns (from the camera to the object and back to the sensor). This example makes clear that any additional delay, even as small as 10 ps, will result in distance measurement errors. Several techniques exist for measuring this delay, and some kind of calibration is usually required to compensate for any unwanted delays of the sensor; however, such calibration is typically done only during production of the camera.

A problem associated with range sensors is that internal delays may vary over time or manufacturing tolerances, e.g., but not limited thereto, due to temperature drift and/or ageing effects and/or external lighting conditions, causing measurement errors. In typical environmental conditions and under typical manufacturing tolerances, internal delays could vary over a range of more than 100 ps. In typical applications, 1 cm or better range accuracy is required, hence requiring delay tuning over a wide range (several 100 ps) and with high resolution (10 ps). Such internal delay variations may be compensated by dedicated hardware elements, with the drawback of increased components, increased complexity and thus cost of such sensors.

A time-of-flight camera is described by Schwarte in WO98/10255, wherein an optical feedback path from a light emitting module to one or more sensor cells of the light receiving camera is used as a phase reference for synchronization purposes, by guiding the emitted light without reflection to the receiver, e.g. through an optical fibre.

Figure 1:
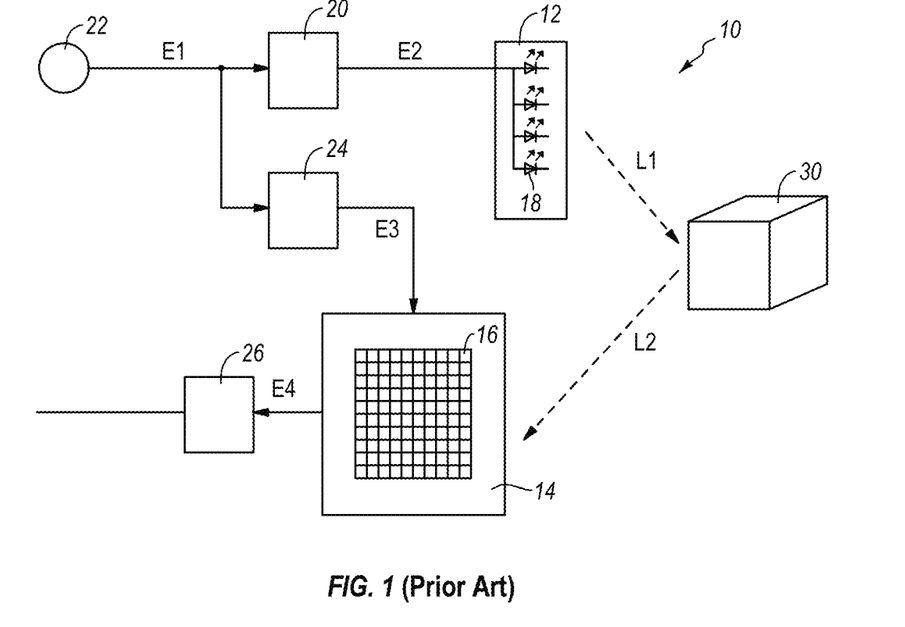
FIG. 1 shows a block-diagram of a ToF camera with an electrical feedback path, known in the art.

A very comprehensive description of the time-of-flight camera described in WO98/10255 is disclosed by IEE in U.S.2008180650(A1), and incorporated hereafter to illustrate the workings of a ToF camera. Referring to FIG. 1, the block diagram of the 3D imaging system 10 comprises an illumination unit 12 for emitting light onto a target scene, and an imaging sensor 14, for imaging the target scene. The imaging sensor 14 comprises the required optical accessories such as a focusing lens (not shown) and an electronic camera chip executed in any suitable technology, such as CCD (charge coupled device), CMOS (Complementary Metal Oxide Semiconductor) and/or TFA (thin film on ASIC). Accordingly, the imaging sensor 14 comprises a two-dimensional array of individual lock-in pixel sensor cells 16 each of which images a small portion of a target scene for creating a pixel-by-pixel image thereof. The illumination unit 12 comprises several individual light emitting devices 18 such as light emitting diodes (LEDs), which are collectively driven by means of an illumination driver 20. A signal source 22 provides the input signals for the illumination driver 20 and a photo gate driver 24. The output of the photo gate driver 24 is connected to the imaging sensor 14. An evaluation unit 26 comprising a suitable electronic calculation device, e.g. a digital signal processor (DSP), is connected to the output of the imaging sensor 14.

In operation, the 3D imaging system 10, based on the phase shift measurement method, works as summarized below. The signal source 22 generates a modulation signal E1 on its output and feeds this modulation signal E1 to the illumination driver 20. The latter drives the illumination unit 12 with a drive signal E2 to emit a temporally modulated light signal L1 onto a target scene comprising an object 30 (for illustration purposes). Examples for temporal modulation of the light signal L1 are a sinusoidal amplitude (i.e. light intensity) modulation or a periodically pulsed emission scheme. The modulated light signal L1 is reflected or scattered by the object 30 so as to form a returning light signal L2 which is received as incident light by the imaging sensor 14. The modulation signal E1 is also fed to the photo gate driver 24 which transforms the modulation signal E1 into a demodulation signal E3. The imaging sensor 14 receives this demodulation signal E3. By means of this demodulation signal E3 and the detected light signal L2, the imaging sensor 14 produces a phase (and optionally, amplitude) information signal E4 which is fed to the evaluation unit 26 for extraction of the distance information concerning the object 30. Further details regarding the 3D imaging technology schematically shown in FIG. 1 can be found e.g. in WO98/10255 and the relevant literature.

The measurement accuracy of the device shown in FIG. 1 is limited due to unknown and/or time varying signal propagation times and component delays. In fact, ideally there should be no phase difference between the light signal L1 emitted at the illumination unit 12 and the demodulation signal E3. However, an uncontrollable phase difference may be introduced between these signals due to several factors such as time varying delays in the illumination driver 20 and the photo gate driver 24, e.g. due to temperature or ageing. This phase difference adversely affects synchronization. As a result, significant errors may occur in the determination of the absolute distance information, which is based on the phase relationship between the light signal L1 emitted at the illumination unit 12 and the light signal L2 detected at the imaging sensor 14. The approach taken by Schwarte in WO98/10255 to address this problem requires extra hardware, such as a light conductor and optical shielding.

U.S.2008180650(A1) further discloses a 3D-imaging system comparable to the one described in WO98/10255, but wherein the optical feedback path is replaced by an electrical feedback path. Such a system still requires additional hardware, such as one or more elements selected from the group of a shunt resistor, a mixer and an optical element.

SUMMARY OF THE INVENTION

It is an object of embodiments of the present invention to provide a good method for determining and/or compensating range offset of an image sensor.

It is an advantage of a method according to embodiments of the present invention that it provides a robust and relatively simple way for correcting distance information.

It is an advantage of a method according to embodiments of the present invention that it provides a way for on-the-fly compensating range offset of an image sensor.

It is an advantage of a method according to embodiments of the present invention that it does not require additional hardware, such as an optical or electrical feedback path.

It is an advantage of embodiments of the present invention that the method is a post-processing method.

The above objective is accomplished by a method and device according to the present invention.

In a first aspect of the invention, a method is provided for determining a range offset of a range sensor, the range sensor having a predetermined position in a spatial environment and comprising a pixel array adapted for measuring a distance of each pixel of the pixel array to a corresponding position in the spatial environment, the spatial environment comprising at least two stationary reference positions, a first resp. second reference position located at a first resp. second predetermined reference distance from the range sensor, the method comprising: a) determining a distance value to each of the at least two reference positions using the pixel array; b) calculating at least two differences between each determined distance value and the corresponding predetermined reference distance of the at least two reference positions; c) determining a range offset value of the range sensor by calculating the maximum of the at least two differences.

It is an advantage of embodiments of the method of the present invention that it can be implemented in software, as post-processing, without requiring a specific light path or specific light coupling features, as compared to range sensors in the art.

It is an advantage of embodiments of the method of the present invention that it does not require an on-the-fly measurement of operating conditions, such as e.g. temperature measurement by a temperature sensor, for offset compensation.

It is an advantage of embodiments of the method of the present invention that only one reference position needs to be visible by the sensor in order to correctly determine the range offset. The method will work correctly even if the line-of-sight to all but one reference position is blocked by unknown objects (e.g. clothing) in the scene. By carefully choosing the reference positions in the scene, e.g. positions on a door style, the risk that they will both be covered is low and hence, the robustness of the algorithm is increased.

It is an advantage of embodiments of the method of the present invention that only very simple mathematical functions are required, thus it can be performed on a processor with limited resources (e.g. no multiplier required). Or stated in other words, the processing can be performed in a very short time, thereby allowing a high frame-rate to be maintained.

In embodiments of the present invention, determining a range offset takes into account known characteristics of the range sensor over operation conditions of interest.

It is an advantage of the method of the present invention that its complexity is linear with the number of reference points N (thus not in the order of N.log(N) or $N^2$). This means that doubling the number of reference points only doubles the time needed for calculating the range offset value. Given the extremely simple math required, the number of reference positions may be chosen to be relatively large, e.g. 20 or 50 or 100 reference points. By increasing the number of reference points, the risk that all the reference points are hidden is completely eliminated or at least negligibly small for all practical situations.

In an embodiment of the method, the spatial environment is the inner space of the cabin of a vehicle. This is a spatial environment for which the method is highly suitable.

In an alternative embodiment of the method, the spatial environment is the backside of a vehicle, as e.g. for a parking aid sensor. In this case, the reference positions could be on e.g. the bumper (the image should partially subtend the bumper).

In a second aspect of the present invention, a method is provided for compensating range offset of a range sensor, the range sensor having a predetermined position in a spatial environment and comprising a pixel array adapted for measuring a distance of each pixel of the pixel array to a corresponding position in the spatial environment, the spatial environment comprising at least two stationary reference positions, a first resp. second reference position located at a first resp. second predetermined reference distance from the range sensor, the method comprising the steps of:
a) determining a distance value (m1, m2) to each of the at least two reference positions (p1, p2) using the pixel array (14);
b) calculating at least two differences ($\Delta 1$, $\Delta 2$) between each determined distance value (m1, m2) and the corresponding predetermined reference distance (rd1, rd2) of the at least two reference positions (p1, p2);
c) determining an in-situ range offset value (rov) of the range sensor (100) by calculating the maximum of the at least two differences ($\Delta 1$, $\Delta 2$);
d) measuring a plurality of distance values to positions within the spatial environment using the pixel array;
e) correcting the measured distance values by subtracting the determined in-situ range offset value from each of the measured distance values.

It is an advantage of embodiments of the method of the present invention that it can be implemented in software, as post-processing, without requiring a specific light path or specific light coupling features, as compared to range sensors in the art.

It is an advantage of embodiments of the method of the present invention that it does not require an on-the-fly measurement of operating conditions, such as e.g. temperature measurement by a temperature sensor, for offset compensation.

It is an advantage of embodiments of the method of the present invention that only one reference position needs to be visible by the sensor in order to correctly determine the range offset. The method will work correctly even if the line-of-sight to all but one reference position is blocked by unknown objects (e.g. clothing) in the scene. By carefully choosing the reference positions in the scene, e.g. positions on a door style, the risk that they will both be covered is low and hence, the robustness of the algorithm is increased.

It is an advantage of embodiments of the method of the present invention that only very simple mathematical functions are required, thus it can be performed on a processor with limited resources (e.g. no multiplier required). Or stated in other words, the processing can be performed in a very short time, thereby allowing a high frame-rate to be maintained.

In embodiments of the present invention, determining a range offset takes into account known characteristics of the range sensor over operation conditions of interest.

It is an advantage of the method of the present invention that its complexity is linear with the number of reference points N (thus not in the order of $N.\log(N)$ or $N^2$). This means that doubling the number of reference points only doubles the time needed for calculating the range offset value. Given the extremely simple math required, the number of reference positions may be chosen to be relatively large, e.g. 20 or 50 or 100 reference points. By increasing the number of reference points, the risk that all the reference points are hidden is completely eliminated or at least negligibly small for all practical situations.

In an embodiment of the method, the spatial environment is the inner space of the cabin of a vehicle. This is a spatial environment for which the method is highly suitable.

In an alternative embodiment of the method, the spatial environment is the backside of a vehicle, as e.g. for a parking aid sensor. In this case, the reference positions could be on e.g. the bumper (the image should partially subtend the bumper).

In a third aspect of the present invention, a range sensor is provided, comprising:
a pixel array comprising a plurality of pixels, and adapted for measuring a distance of each pixel of the pixel array to a corresponding position in a spatial environment;
a memory for storing at least two predetermined reference distances;
an evaluation unit comprising a program for performing the method as described above.

In a fourth aspect of the present invention, a vehicle is provided, comprising such a range sensor.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In the present invention, the term "camera" is used for the system comprising at least an "image sensor" and a receiving lens. With "image sensor" is meant an electrical circuit, e.g. an integrated circuit (IC), that converts light into an electrical signal.

In the present description, the terms "reference points" and "reference positions" are used as synonyms.

Whereas the prior art solutions concentrate on synchronizing signals entering the image sensor 14 (e.g. E3 and L2 in FIG. 1), the present invention provides a solution using post-correction. It is assumed that the range sensor 100 has a predetermined position in a spatial environment, the latter having at least two stationary reference positions p1, p2. The result of the method according to embodiments of the present invention is that the range sensor 100 of embodiments of the present invention provides distance data which are corrected for range offset caused by an unknown time delay, e.g. due to temperature and/or ageing effects and/or manufacturing tolerances, without having an optical or electrical feedback path as used in the art. Apart from this feedback path, the hardware of a ToF camera using such method may be the same as that shown in FIG. 1, unless specifically mentioned otherwise. When using pieces of hardware of the 3D imaging system 10 of FIG. 1, parts of the method according to embodiments of the present invention may be implemented on the evaluation unit 26, for example in software if the evaluation unit 26 is programmable.

Figure 2:
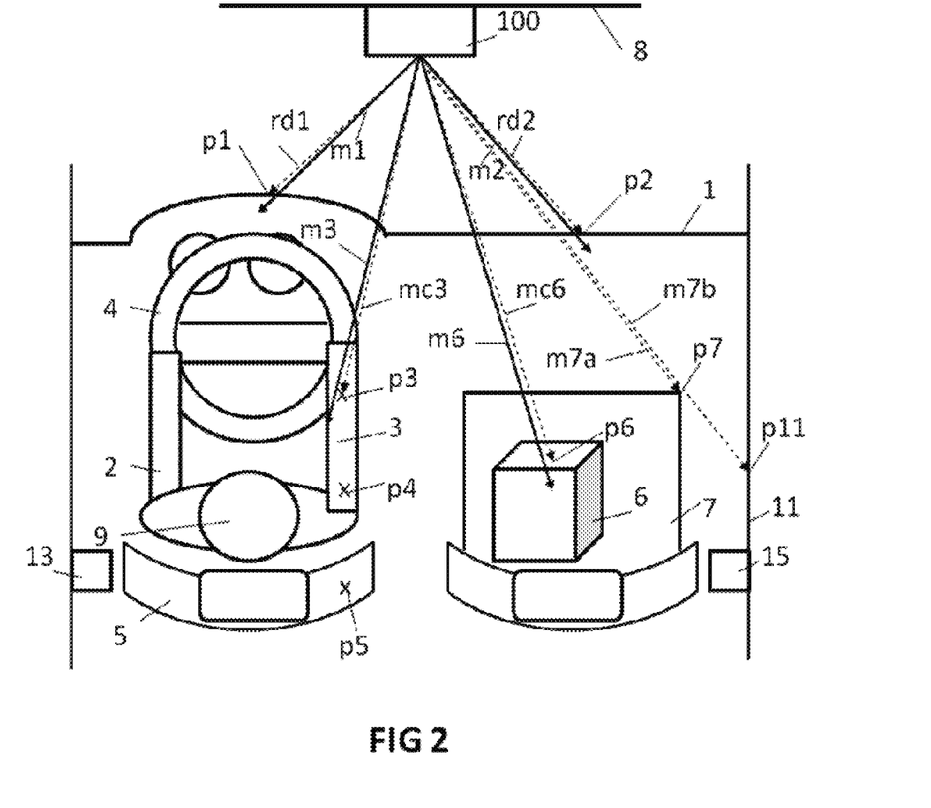
FIG. 2 shows an example of a ToF camera located in a car cockpit, adapted for using two reference points on the dashboard, according to aspects of the present invention.

FIG. 2 shows an example of such a spatial environment where the compensation method proposed by embodiments of the present invention can be applied. FIG. 2 shows a range sensor 100, mounted in a fixed position to the overhead console 8 of a car, but the method will also work in other suitable spatial environments where the position of the camera (and thus the image sensor of the camera) is fixed relative to elements in the scene that it is observing. With "fixed relative to elements in the scene it is observing" is meant that the relative position of the camera should be guaranteed to vary less than an expected error that needs to be compensated by a method according to embodiments of the present invention. The scene observed by the camera 100 typically comprises first elements with a fixed position relative to the camera 100, e.g. a dashboard 1, a left or right door style 13, 15, etc, and second elements of which the position relative to the camera 100 may change over time, e.g. an adjustable steering wheel 4, a left arm 2, a right arm 3, a head 9 of a driver, a box 6, an adjustable driver seat or passenger seat 5, 7, etc. The method for range offset compensation according to embodiments of the present invention is based on using predefined positions and distances to the sensor 10 of such first elements with fixed position relative to the camera 100. However, a challenge for the robustness of the method is the presence of second elements which have no fixed position in the camera's field of view, and which may block the line-of-sight to the first elements, some of which may be used as reference positions. The inventors have found a way to overcome this additional problem, as will be described next.

Referring to FIG. 2, an example will be described wherein the reference points p1, p2 on the first elements are not blocked by second elements. During a design phase of the camera 100, at least two reference positions (also called "reference points") p1, p2, are selected amongst the first elements, the physical distances between these reference positions p1, p2 and the image sensor 100 are determined, and the distance values are stored as predetermined reference distances rd1, rd2. They may e.g. be stored in a non-volatile memory (e.g. flash or EEPROM) of the sensor 100, which memory may be connected to the evaluation unit 26 or embedded therein, or they may even be hardcoded in the program in ROM.

In an embodiment, the at least two reference positions p1, p2 are chosen sufficiently apart, e.g. at least 1.0 m apart, so that the risk of the lines-of-sight to both positions being blocked by one or more second elements (e.g. clothing) is reduced. Edges of objects (e.g. an edge p7 of the passenger seat 7, even if the position of the seat 7 would be fixed hence the passenger seat 7 would be a first element), are better avoided, because small angular deviations of the sensor 100 may result in large variations of the measured distance: m7a towards the seat, or m7b towards the right door 11. Besides, car seats are typically movable, and therefore a priori not suited as reference positions on first elements.

In the example shown in FIG. 2, one reference point p1 is chosen on top of the dashboard 1 in front of the driver seat 5, and a second reference point p2 is chosen also on top of the dashboard 1, but in front of the passenger seat 7. The invention, however, is not limited thereto, and other reference positions on fixed first elements may also be chosen. The actual distances to these reference points rd1 and rd2 are stored in a memory as predetermined values, obtained for example from available CAD data. These distances are also indicated on the figure (in dotted line).

During actual use of the sensor 100, the distances from the sensor 100 to the first and second reference position p1, p2 are measured by the distance measurement means of the sensor 100 itself, yielding for example the values m1 and m2, which in FIG. 2 are deliberately shown too large to illustrate a range offset e.g. due to ageing. A principle underlying embodiments of the present invention is that all pixels within a considered image region of interest experience a same range offset. This is true for offsets due to e.g. optical or electrical delays in the active lighting circuit or sources, as well as for offsets due to e.g. electrical delays in the reference signal that goes to the pixels. In the example illustrated and described, a positive range offset (the measured range is larger than the actual range) is assumed, but the method also works for a negative range offset (the measured range is smaller than the actual range). In practice (assuming the orientation of the sensor 100 is ideal) the lines with references "m1" and "rd1", resp. "m2" and "rd2", would coincide, but they are deliberately drawn apart in FIG. 2, with a small angular difference to clearly indicate the different lengths, for illustrative purposes. As a next step, first and second difference values Δ1 and Δ2 are calculated, using the formulas:

$$\Delta 1 = m1 - rd1; \qquad (1)$$

m1 being the measured distance value to the first reference position p1 (e.g. 70.0 cm), rd1 being the predetermined first distance value (e.g. 68.0 cm), $$\Delta 2 = m2 - rd2; \qquad (2)$$

m2 being the measured distance value to the second reference position p2 (e.g. 71.0 cm), rd2 being the predetermined second distance value (e.g. 69.0 cm).

In the example illustrated in FIG. 2, where none of the reference points p1, p2 are blocked (i.e. they are both visible by the sensor 100), the differences Δ1 and Δ2 will be the same (e.g. 2.0 cm in the example above). As a next step, the maximum of these difference values Δ1 and Δ2 is determined, and that maximum value is taken as the range offset value (or "distance offset value"), indicated by "rov", thus:

$$\text{rov} = \max(\Delta 1, \Delta 2); \quad (3)$$

In the example, "rov" is thus set to 2.0 cm.

Once this range offset value "rov" is determined, any other measured distance value m3, m6 can be compensated by decreasing the other distance value m3 by the range offset value "rov". Again, the underlying principle is that all pixels within a considered image region of interest experience the same range offset, which is true for the optical or electrical delays being considered, e.g. optical or electrical delays in the active lighting circuit or sources, electrical delays in the reference signal that goes to the pixels. For example, the distance to the point p3 on the right arm of the driver is measured by the sensor 100 as the value m3 (which is again too large), and is then compensated by subtracting the range offset value "rov", by using the formula:

$$mc3 = m3 - \text{rov}; \quad (4),$$

where m3 is the measured distance to point p3 (e.g. 95.0 cm), and mc3 is the corrected distance. In the example mc3 would be calculated as: 95.0 cm−2.0 cm=93.0 cm.

The formula (4) can be used to correct (i.e. compensate) any measured distance value "m", including m1 and m2 to the first and second reference position p1, p2. Indeed, using formula (4) on the measured distances m1 and m2 would yield the correct results of values equal to the predetermined distances rd1, rd2.

Figure 3:
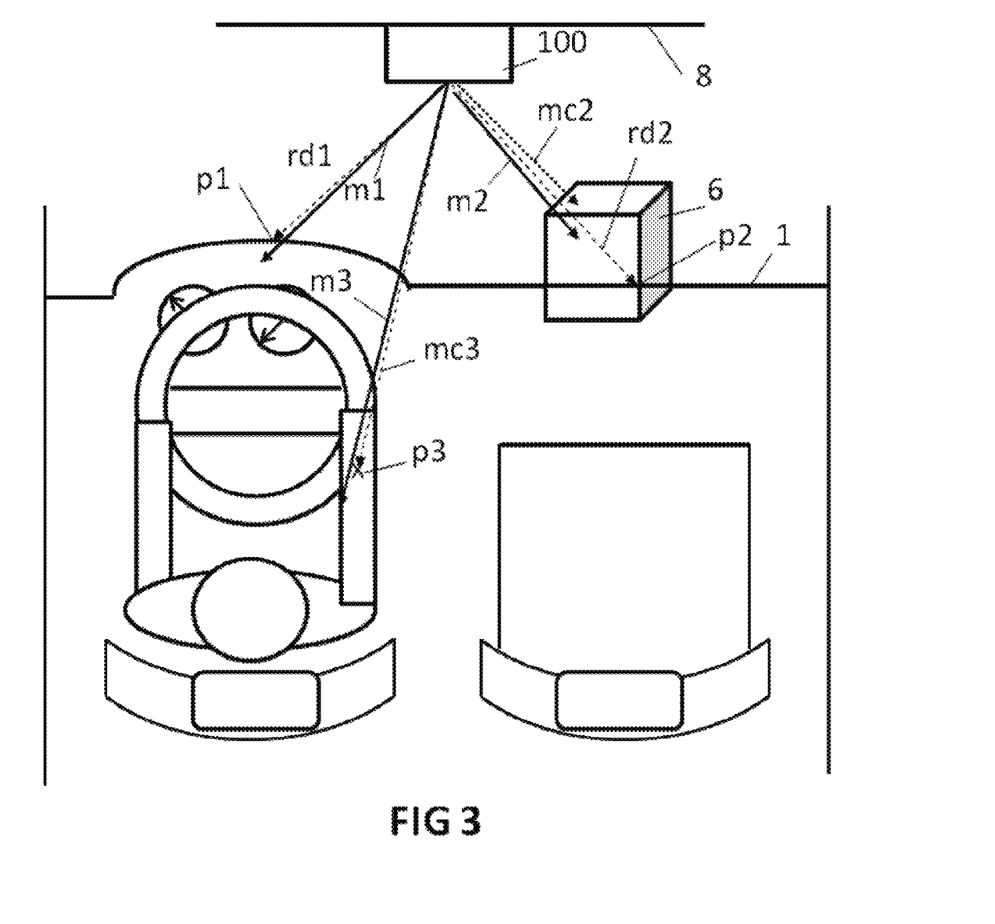
FIG. 3 shows an example of the ToF camera of FIG. 2, whereby one of the reference points is blocked by an object.

FIG. 3 shows a variant of the configuration of FIG. 2, but now a second element, a box 6 is placed on the dashboard 1 between the sensor 10 and the second reference point p2. In general terms, any second element that is not fixed, such as e.g. a person or an object present in the spatial area, may block the line-of-sight between the sensor 100 and one or more of the at least two reference points p1, p2 on the first elements. For the method of compensation to work correctly, it suffices that at least one reference point p1 remains visible by the sensor 100. The more reference points are selected on the first elements, the smaller the risk that all reference points are blocked, and thus the more robust and fail-safe is the method according to embodiments of the present invention. In the example of FIG. 3 the first reference position p1 remains visible to the sensor 100, while the second reference position p2 is not. The measured values for m1 and m2 in FIG. 3 would be e.g. m1=70.0 cm and m2=53.0 cm, in view of the presence of the box 6. Applying the same formulas (1), (2) and (3) as above, would yield:

$$\Delta 1 = m1 - rd1 = 70.0 - 68.0 = 2.0 \text{ cm},$$

$$\Delta 2 = m2 - rd2 = 53.0 - 68.0 = -15.0 \text{ cm},$$

$$\text{rov} = \max(\Delta 1, \Delta 2) = 2.0 \text{ cm}.$$

This means that, in the example given, the measured values "m" are 2.0 cm too long, and in order to compensate for the unwanted delay (or range offset), e.g. due to ageing or temperature, 2.0 cm needs to be subtracted from the measured values. The corrected distance for m2 is:

$$mc2 = m2 - \text{rov} = 53.0 \text{ cm} - 2.0 \text{ cm} = 51.0 \text{ cm}.$$

A similar formula can be applied for all other measured distances "m".

When comparing the configuration of FIG. 3 with that of FIG. 2, it becomes clear that the method according to embodiments of the present invention with two reference positions p1, p2 works correctly, as long as the view to at least one of the reference points is not obstructed.

It may be noted that the idea behind formula (3) is based on the observation that the actual physical distance between the sensor 100 and any of the reference points p1, p2 can only decrease, not increase, w.r.t. the corresponding predetermined distance values rd1, rd2, when second elements (e.g. people or objects) are added to the spatial environment (e.g. the car cockpit). The inventors have found that because of this reason, the range offset value "rov" can be calculated by simply determining the maximum of the differences Δ1, Δ2, as described above.

Several further improvements can be added to the method described above, to make the method more robust in practice. In an embodiment, the number N of reference points may be more than two, e.g. three or more, or four or more, or five or more, or ten or more, or twenty or more, or fifty or more, or even still more. As described before, the method described above yields the correct results provided that at least one of the reference positions is "visible" (i.e. not blocked) by the sensor 100. Thus the more reference points there are, the lower the risk that all of them are obstructed.

For N reference positions p1, p2, ..., pN, formula (1) becomes:

$$\Delta i = mi - rdi, \text{ for } i=1 \text{ to } N; \quad (5)$$

where N is the number of reference positions, and mi resp. rdi is the measured (raw) distance resp. the predetermined distance value of the reference position pi, and formula (3) then becomes:

$$\text{rov} = \max(\Delta 1, \Delta 2, \ldots, \Delta N), \text{ for } i=1 \text{ to } N \quad (6).$$

In an embodiment, the predefined number N of reference positions p1-pN is at least larger than 20, preferably at least larger than 50, and for each of these reference positions the actual distance is determined beforehand, before actual use of the sensor, e.g. during a design-phase, and stored as a predetermined distance value "rd". It is to be noted that a TOF image sensor can easily comprise 10,000's of pixels; and all of these pixels can, at least theoretically, be suitable reference pixels. However, these positions are not selected at random, because not all positions p are equally suitable reference positions, as explained in the example above for the edge p7 of the passenger seat 7 in FIG. 2. In particular embodiments, only those pixels for which a small variation of the orientation of the camera 100 (e.g. a variation of less than 3° in any direction) would result in a small variation (e.g. less than a threshold value, e.g. 3%) of the actual distance, may be considered suitable pixels. Choosing only such pixels as reference pixels has the advantage that the camera can be mounted with some tolerance margin of e.g. 3° on its orientation, taking into account not only mounting tolerances during manufacturing (e.g. due to fastening screws), but also during the lifetime of the camera.

In an embodiment, the measured distance value mi to each reference position pi is not just determined by measuring the value of a single pixel ai of the array, but by weighting the distance value ai with a confidence value "ni". It is a feature of TOF cameras that both range and reflected active light amplitude can be measured per pixel (with active light is meant the light emitted by the TOF camera itself). The reflection amplitude per pixel depends on the strength of the TOF camera light source and the reflectivity of the scene in the field of view of each pixel. Because the signal to noise ratio (SNR) of the measured range decreases with lower reflection amplitude, it is a suitable measure of confidence of the range value. Reflection amplitudes which are below a pre-determined threshold indicate that range values are unreliable and should be discarded. Reflection amplitude of pixels that are outside a pre-determined range, e.g. because an object lies in their field of view, indicate that the pixel is unsuitable as a reference point and should be ignored. The method described above is generally useful for range sensors 100 that do not have delay (or timing or offset) compensation in hardware. The method is particularly useful for in-cabin 3D camera applications using time-of-flight sensors not having specific offset compensation in hardware.

Depending on the application, the range offset value "rov" may not have to be calculated each frame, but for example only periodically, e.g. only once every second, or for example only once every 50 frames.

The invention claimed is:

1. A method for determining a range offset of a range sensor due to a time varying delay, the range sensor having a predetermined position in a spatial environment and comprising a pixel array adapted for measuring a distance of each pixel of the pixel array to a corresponding position in the spatial environment, the spatial environment comprising at least two reference positions that are stationary with respect to the range sensor, the at least two reference positions including a first reference position and a second reference position, the first reference position being located at a first predetermined reference distance from the range sensor and the second reference position being located at a second predetermined reference distance from the range sensor, the first predetermined reference distance and the second predetermined reference distance being stored in a non-volatile memory or being hardcoded in the range sensor, the method comprising the steps of:
   a) determining a plurality of distance values, including at least a first distance value to the first reference position and a second distance value to the second reference position using the pixel array;
   b) calculating at least two differences, including a first difference and a second difference, the first difference being between the determined first distance value and the corresponding first predetermined reference distance of the first reference position, and the second difference being between the determined second distance value and the corresponding second predetermined reference distance of the second reference position; and
   c) calculating a maximum of the at least two differences; and
   d) determining an in-situ range offset value of the range sensor as said calculated maximum.

2. The method according to claim 1, where the spatial environment is the inner space of the cabin of a vehicle.

3. The method according to claim 2, wherein the first reference position is a first predefined position on a dashboard in front of a driver seat, and the second reference position is a second predefined position on the dashboard in front of a passenger seat.

4. The method of claim 1, wherein step a) comprises determining a third distance value to a third reference position using the pixel array.

5. The method of claim 1,
   wherein step a) comprises determining at least ten distance values corresponding to at least ten reference positions; and
   wherein step b) comprises calculating at least ten difference values; and
   wherein step c) comprises determining the in-situ range offset of the range sensor by calculating the maximum of the at least ten differences.

6. The method of claim 5,
   wherein step a) further comprises measuring for each reference position also a signal amplitude; and
   wherein step c) further comprises discarding one or more of the at least ten differences if the corresponding signal amplitude is below a predefined threshold.

7. The method of claim 1, wherein the range sensor is a time-of-flight image sensor.

8. A method of compensating range offset of a range sensor due to a time varying delay, the range sensor having a predetermined position in a spatial environment and comprising a pixel array adapted for measuring a distance of each pixel of the pixel array to a corresponding position in the spatial environment, the spatial environment comprising at least two reference positions that are stationary with respect to the range sensor, the at least two reference positions including a first reference position and a second reference position, the first reference position being located at a first predetermined reference distance from the range sensor and the second reference position being located at a second predetermined reference distance from the range sensor, the first predetermined reference distance and the second predetermined reference distance being stored in a non-volatile memory or being hardcoded in the range sensor, the method comprising the steps of:
   a) determining a range offset of the range sensor by:
      i) determining a plurality of reference distance values, including at least a first reference distance value to the first reference position and a second reference distance value to the second reference position using the pixel array;
      ii) calculating at least two differences, including a first difference and a second difference, the first difference being between the determined first distance value and the corresponding first predetermined reference distance of the first reference position, and the second difference being between the determined second distance value and the corresponding second predetermined reference distance of the second reference position;
      iii) calculating a maximum of the at least two differences; and
      iv) determining an in-situ range offset value of the range sensor as said calculated maximum;
   b) measuring a plurality of distance values to positions within the spatial environment using the pixel array; and
   c) correcting the measured distance values by subtracting the determined in-situ range offset value from each of the measured distance values.

9. The method according to claim 8, where the spatial environment is the inner space of the cabin of a vehicle.

10. The method according to claim 9, wherein the first reference position is a first predefined position on a dashboard in front of a driver seat, and the second reference position is a second predefined position on the dashboard in front of a passenger seat.

11. The method according to claim 8, where the spatial environment is a space outside of a vehicle, comprising at least part of a bumper of said vehicle.

12. The method of claim 8, wherein step a) comprises determining a third distance value to a third reference position using the pixel array.

13. The method of claim 8,
wherein step a) comprises determining at least ten distance values corresponding to at least ten reference positions;
wherein step b) comprises calculating at least ten difference values;
wherein step c) comprises calculating a maximum of the at least ten differences; and
wherein step d) comprises determining the in-situ range offset of the range sensor as said calculated maximum.

14. The method of claim 13,
wherein step a) further comprises measuring for each reference position also a signal amplitude; and
wherein step c) further comprises discarding one or more of the at least ten differences if the corresponding signal amplitude is below a predefined threshold.

15. The method of claim 8, wherein the range sensor is a time-of-flight image sensor.

16. A range sensor adapted to determine a range offset of the range sensor due to a time varying delay when being mounted at a predefined position in a spatial environment, the spatial environment including at least two reference positions adapted to be stationary with respect to the range sensor, the at least two reference positions including a first reference position and a second reference position, the first reference position being located at a first predetermined reference distance from the range sensor and the second reference position being located at a second predetermined reference distance from the range sensor;
wherein the range sensor comprises
a pixel array comprising a plurality of pixels, and adapted to measure a distance of each pixel of the pixel array to a corresponding position in the spatial environment;
a memory for storing the at least two predetermined reference distances including the first reference position and the second reference position; and
an evaluation unit, wherein the evaluation unit is configured to
i) determine at least a first distance value to the first reference position and a second distance value to the second reference position using the pixel array,
ii) calculate at least two differences, including a first difference and a second difference, the first difference being between the determined first distance value and the corresponding first predetermined reference distance of the first reference positions, and the second difference being between the determined second distance value and the corresponding second predetermined reference distance of the second reference positions,
iii) calculate a maximum of the at least two differences, and
iv) determine an in-situ range offset value of the range sensor as said calculated maximum.

17. A vehicle comprising the range sensor according to claim 16.

18. The range sensor of claim 16, wherein the range sensor is a time-of-flight image sensor.

* * * * *